United States Patent [19]

Millar et al.

[11] Patent Number: 4,594,907
[45] Date of Patent: Jun. 17, 1986

[54] RECIPROCATING MACHINE COMPONENT

[76] Inventors: Barry C. Millar, 33 Burnhamthorpe Park Blvd., Islington, Ontario, Canada; Keith W. Little, 7 Dan Ridge Crescent, Georgetown, Ontario, Canada

[21] Appl. No.: 654,480

[22] Filed: Sep. 26, 1984

[51] Int. Cl.⁴ .......................... F16H 21/44; F16C 5/00
[52] U.S. Cl. ........................................ 74/105; 384/40; 384/42
[58] Field of Search ........................ 74/105, 106, 110; 248/429; 308/3 R, 3 A

[56] References Cited

U.S. PATENT DOCUMENTS

| 912,277 | 2/1909 | Benson | 74/105 |
| 1,688,316 | 10/1928 | De Veau | 248/429 |
| 2,195,841 | 4/1940 | Schlitters | 308/3 A |
| 2,440,919 | 5/1948 | Shaw | 308/3 A |
| 2,586,915 | 2/1952 | Cate | 74/110 |
| 3,000,242 | 9/1961 | Barrett | 74/110 |
| 3,360,306 | 12/1967 | Vargady | 308/3 R |
| 3,586,395 | 6/1971 | Weaver | 308/3 A |

FOREIGN PATENT DOCUMENTS

| 44404 | 10/1934 | France | 248/429 |
| 770 | of 1895 | United Kingdom | 308/3 R |
| 749384 | 5/1956 | United Kingdom | 308/3 R |

Primary Examiner—Lawrence J. Staab

[57] ABSTRACT

A machine component includes an elongated base plate with side edges and a slide plate which is rectangular in cross-section and has parallel straight side edges. A cylinder and piston assembly are provided, one part of the assembly being supported from the base plate the other being connected to the slide plate. Two elongated guide members each have a rectangular slot which slidingly receives the edge of the slide plate. Each elongated guide member has a lower part and an upper part and fasteners securing them together. The lower part is attached to the base plate, and the rectangular slot has (1) a first side wall adjacent to and parallel with the base plate, the first side wall being defined by a surface of the lower part, (2) a second side wall defined by a surface of the upper part, and (3) a bottom wall defined by a surface of one of the upper and lower parts. The upper and lower parts have oblique mating surfaces such that longitudinal movement of one part with respect to the other causes the parts to separate from or approach each other in a manner to change the width of the slot.

9 Claims, 7 Drawing Figures

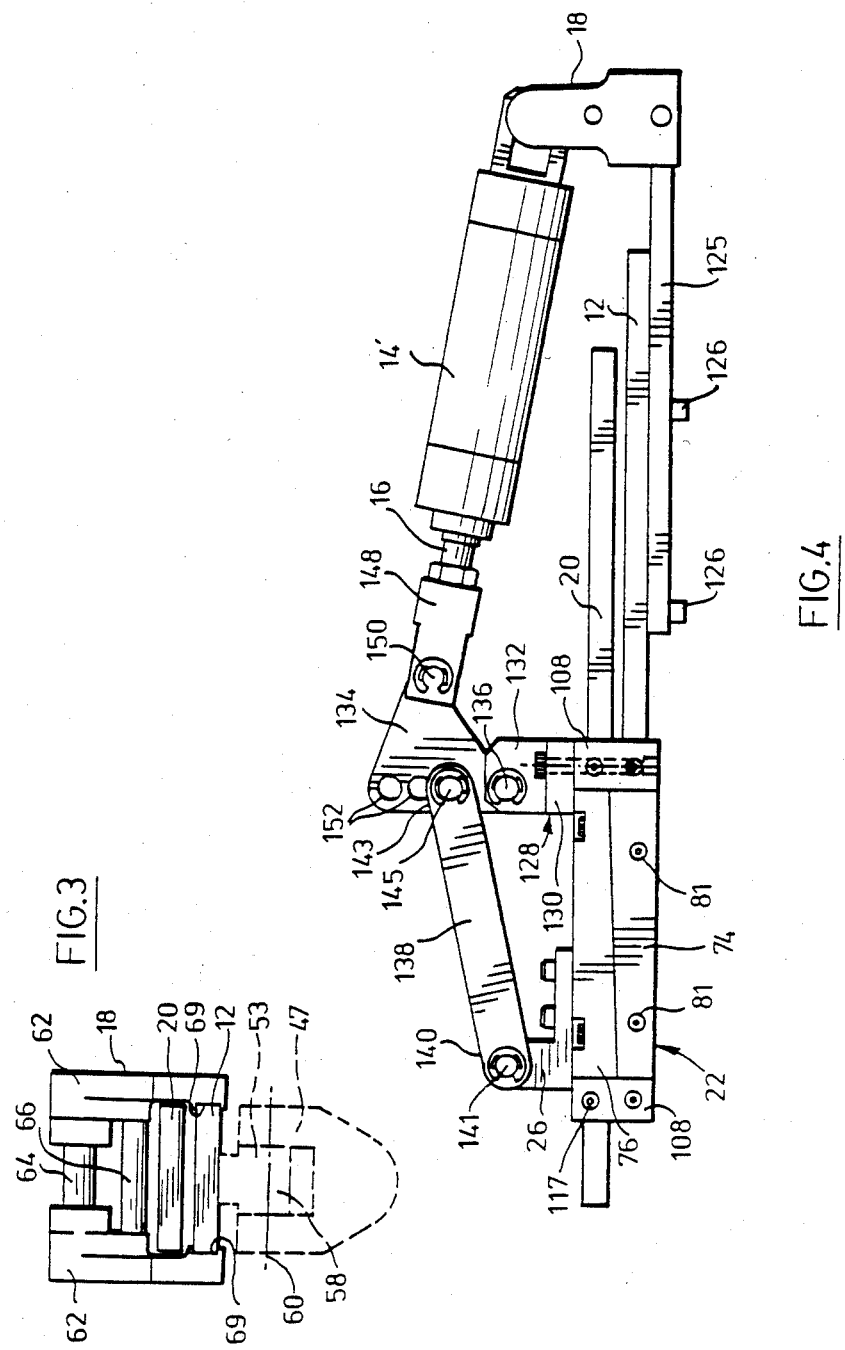

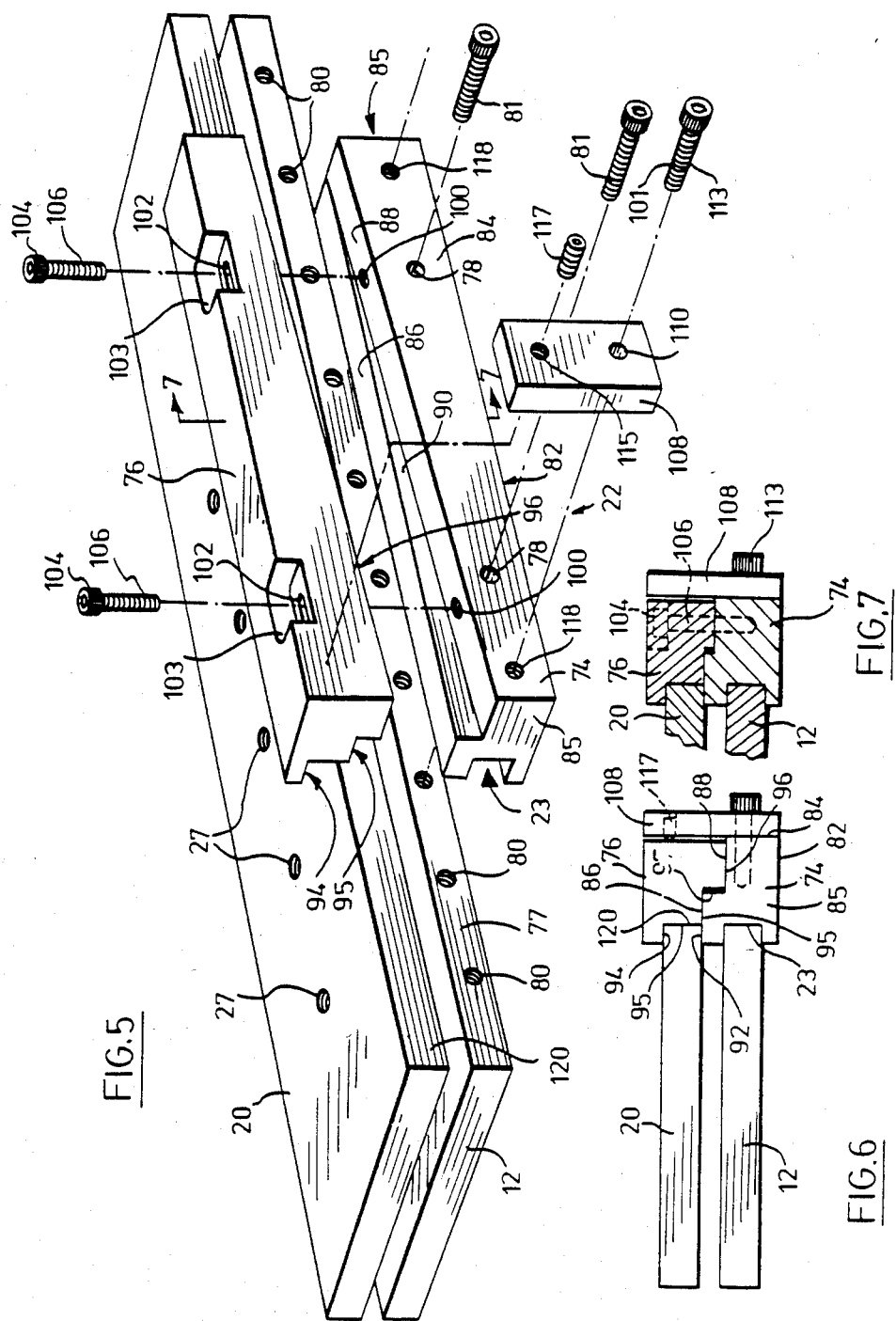

RECIPROCATING MACHINE COMPONENT

This invention relates generally to a machine component designed and constructed so that it can be used either alone to carry out certain specific functions in a manufacturing or related process, or can be used with other similar components to set up a more complex machine in a rapid manner without involving extensive design costs.

BACKGROUND OF THIS INVENTION

Many industrial and manufacturing processsess consist in carrying out, either sequentially or simultaneously, certain specific operations on a workpiece. As an example, it may be desired to carry out a series of bending operations on a light metal tube, in order to give it a specific configuration which will adapt it to a machine for which it is designed. A typical way of carrying out such a manufacturing procedure is to bring about the various bends in the tube in a specific sequence from one end to the other, involving various pusher plates which engage the tube in sequence, thus bringing about the bends.

This process, and many related processes, require the machine to carry out what are essentially reciprocating movements. The reciprocation may be rectilinear or curvilinear, but either way, the concept of a single back-and-forth motion is involved.

The machine component provided herein is especially adapted and designed to be able to provide such reciprocating movements on command, and moreover is designed in such a way that it may be used, if desired, along with other similar components to fabricate very rapidly and inexpensively a complex machine capable of carrying out a number of sequential or simultaneous operations, all of which involve reciprocating motion.

GENERAL DESCRIPTION OF THIS INVENTION

Accordingly, this invention provides a machine component which includes, inter alia, an elongated base plate with side edges, a linear actuator assembly having two parts which can move away from and toward each other, and first mounting means on the base plate, the mounting means supporting one part of the cylinder and piston assembly. A slide plate is provided which is rectangular in cross-section and has parallel straight side edges, and two elongated guide members are provided, each having a rectangular slot adapted to slidingly receive the edge of the slide plate. Each elongated guide member includes a lower part and an upper part, and means for securing them together. The lower part has means for attachment to the base plate. The rectangular slot has (1) a first side wall adjacent to and parallel with the base plate, the first side wall being defined by a surface of the lower part, (2) a second side wall defined by a surface of the upper part, and (3) a bottom wall defined by a surface of one of said upper and lower part. The upper and lower parts have oblique mating surfaces such that longitudinal movement of one part with respect to the other causes the parts to separate from or approach each other in a manner to change the width of the slot. Second mounting means are provided to establish a connection between the slide plate and the other part of the assembly.

GENERAL DESCRIPTION OF THE DRAWINGS

Two embodiments of this invention are illustrated in the accompanying drawings, in which like numerals denote like parts throughout the several views, and in which:

FIG. 3 is a rear elevational view of a portion of the machine component of FIG. 1;

FIG. 4 is a partial side elevational view of the second embodiment of the machine component of this invention;

FIG. 5 is a perspective view, to a larger scale, of certain components of either embodiment of this invention;

FIG. 6 is a front end view of the components of FIG. 5, when assembled together; and FIG. 7 is a sectional view taken at the line 7—7 in FIG. 5.

DETAILED DESCRIPTION OF THE DRAWINGS

Figure 1:
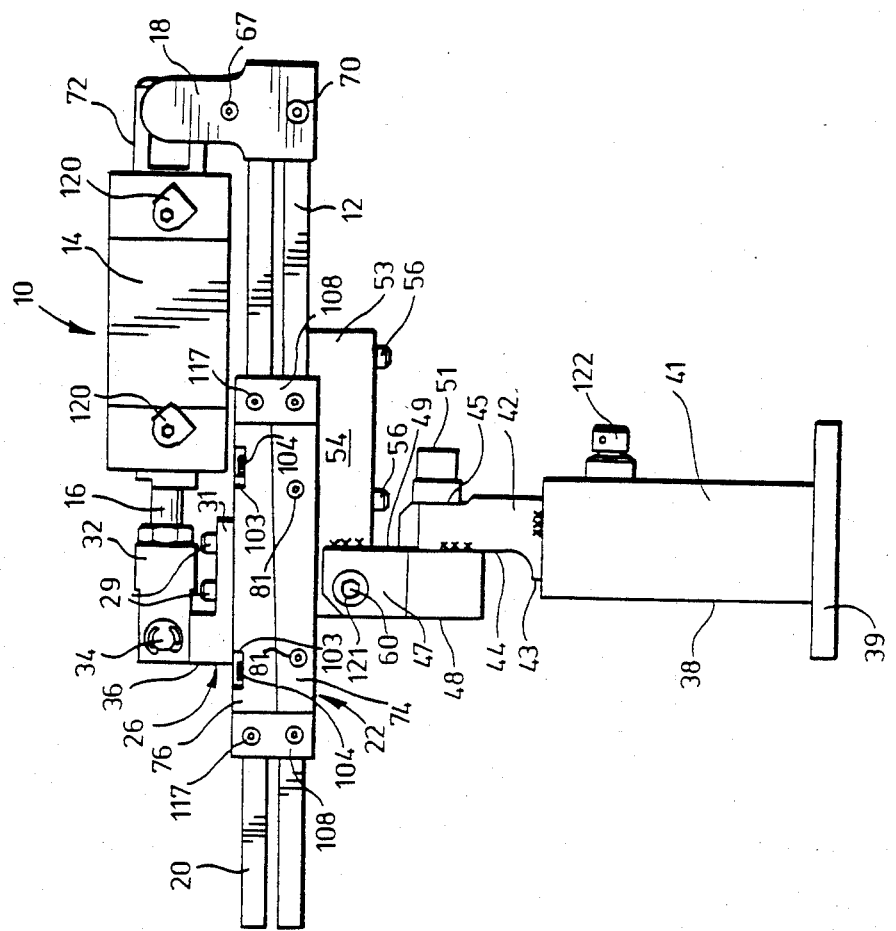
FIG. 1 is a side elevational view of the first embodiment of the machine component in accordance with this invention.

Attention is first direction to FIG. 1, in which the machine component of this invention is identified by the numeral 10. The machine component 10 includes an elongated base plate 12 with parallel straight side edges, a pneumatic cylinder 14 having an extensible piston 16, a mounting means 18 on the base plate 12, the mounting means 18 supporting the cylinder 14, and a slide plate 20 which also has parallel straight side edges. As can be seen in FIG. 5, the two plates 12 and 20 are substantially identical, and each in cross section is rectangular.

Two elongated guide members 22 are provided, each having a first slot 23 for receiving a straight side edge of the base plate 12, and each having a second slot 24 adjacent the first, the second slot 24 being adapted to slidingly receive an edge of the slide plate 20.

A second mounting means is provided for establishing a connection between the piston 16 and the slide plate 20. In the first embodiment of this invention illustrated in FIG. 1, the second mounting means includes a piston bracket 26 which is affixed to the slide plate 20 using any pair of a plurality of threaded bores 27 provided for this purpose (see FIG. 5). Fastening members 29 pass through a flange 31 of the piston bracket 26 and enter adjacent threaded bore holes 27 in the slide plate 20. As can be seen, the piston 16 is secured to a clevis 32 which is pivoted about a pin 34 passing laterally through an upstanding portion 36 of the piston bracket 26.

Returning now to FIG. 1, a more detailed description of the overall structure will be given.

Support means are provided which are capable of supporting the base plate 12 in any desired angular orientation. The support means includes a base 38 having a lower flange 39 and an upstanding hollow column 41. The column 41 has a cylindrical internal axial bore, into which is received a pedestal 42 has a lower cylindrical portion 43 received within the column 41, and which has two flats 44 and 45 in the upper portion. A V-shaped member 47 (see also FIG. 3) has two opposed flat sides 48 and 49, and the flat side 49 is juxtaposed against the flat 44 of the pedestal 42, and secured thereto by means of a cross bolt 51 which passes through a cylindrical bore hole in the pedestal 42 and is threaded into the V-shaped member 47. By slackening off the cross bolt 51, the V-shaped 47 can be angulated with respect to the pedestal 42, and then tightened in any desired angulation.

Located beneath the base plate 12 is a support member 53 which has an elongated portion 54 extending longitudinally of the base plate 12 and secured thereto by threaded fasteners 56. The base plate 12 can be provided with a plurality of suitably tapped holes along a centre line on its underside, to allow the support member 53 to be secured at any of a plurality of positions longitudinally of the base plate 12. The support member 53 also includes a boss portion 58 which is pivotally secured at the axis 60 to the V-shaped member 47. The securement between the support member 53 and the V-shaped member 47 can be tightened in order to lock these two members together in any desired angular postion about the axis 60.

Attention is now directed to FIGS. 1 and 3, for a description of the first mounting means 18. The means 18 includes two opposed upstanding members 62 which sandwich between them a shaft 64, and which are tied together by a tie bar 66. The tie bar has means for drawing the two upstanding members 62 together, which includes a threaded fastener 67 passing through each upstanding member 62 and engaging the tie bar 66. One of the threaded fasteners 67 is visible in FIG. 1.

At the lower end of each upstanding member 62 there is defined a shallow groove 69 which is sized and adapted to receive one edge of the base plate 12. A threaded fastening member 70 secures each upstanding member 62 to the base plate 12.

As can be seen in FIG. 1, the cylinder 14 has a rearward extension 72 by which the cylinder 14 is pivoted to the shaft 64. Thus, the cylinder 14 is suspended above the slide plate 20 by virtue of its connection to the shaft 64 along with the attachment of the piston 16 to the mounting bracket 26.

Attention is now directed to FIGS. 1, 5, 6 and 7, for a description of the elongated guide members 22. As can be seen, the guide members 22, of which one is located at either side of the plates 12 and 20, are composed essentially of two parts: a lower part 74 and an upper part 76. As can be particularly well seen in FIG. 5, the lower part 74 defines the slot 23, as aforesaid, and the slot 23 is adapted to snugly receive a side edge 77 of the base plate 12. The lower part 74 is provided with two bore holes 78 which are adapted to be aligned with spaced pairs of internally threaded bores 80 in the edge 77. As is evident from FIG. 5, the lower part 74 can be affixed to the lower plate 12 at any number of discrete locations, at each of which the bore holes 78 are aligned with two of holes 80. Threaded fasteners 81 are employed for this purpose.

The lower part 74 has a flat underside 82, an outside surface 84, two end surfaces 85, a first top surface 86 which is parallel with the undersurface 82, and a second top surface 88 adjacent the first top surface 86. The second top surface 88 is inclined with respect to the undersurface 82, such that it defines a small acute angle therewith. An intermediate wall 90 of wedge shape stands between the surfaces 86 and 88. As can be seen especially in FIG. 5, the second top surface 88 slopes downwardly or toward the undersurface 82 in the direction from the far right end to the nearer left end, as viewed in the figure.

The first top surface 86 of the lower part 74 provides a first side wall 92 of a second slot which is adapted to receive the side edge of the slide plate 20. As can be especially seen in FIGS. 6 and 7, the upper part 76 of the elongated guide member 22 defines a second side wall 94, as well as the bottom wall 95 of the second slot. As can also be seen in FIGS. 6 and 7, the upper part 76 has surfaces which are complementary to and match the surfaces 86, 88 and 90 of the lower part 74. More particularly, the upper part 76 hs a first lower surface 95 adapted to be juxtaposed against or closely adjacent the first top surface 86 of the lower part 74. The upper part 76 also has an oblique bottom surface 96 which has the same angular relationship with the surface 95 as exists between the surfaces 86 and 88. The upper part 76 also has a wedge-shaped wall 97 to match the wall 90 of the lower part 74. By virtue of the surfaces just described, the upper part 76 and the lower part 74 can nest together with the oblique surfaces 88 and 96 resting upon each other in such a way that, if the upper part 76 were moved rightwardly with respect to the lower part 74 (as viewed in FIG. 5), the side walls 92 and 94 of the second slot would separate from each other, thus widening the second slot. This would take plate because the entire upper part 76 would "ride upwardly" along the ramp defined by the second top surface 88. Conversely, leftward movement of the upper part 76 with respect to the lower part 74 (as viewed in FIG. 5) would cause the side walls 92 and 94 of the second slot to approach each other, thus narrowing the second slot. This adjustability in terms of the width of the second slot permits the amount of "play" (tolerance) between the slide plate 20 and the second slot to be adjusted.

As can be seen in FIG. 5, two threaded bore holes 100 are provided in the lower part 74 at spaced apart locations in the second top surface 88. In the upper part 76, two longitudinally elongated openings 102 are provided, the centres of which are separated by the same distance which separates the bore holes 100. Also, the upper part 76 is cut away as shown at 103 in FIG. 5, in order to allow the heads 104 of threaded fasteners 106 to be received, when the fasteners 106 extend through the openings 102 and are threaded into the threaded bore holes 100. Tightening of the fasteners 106 secures the lower and upper parts 74 and 76 together, once these have been longitudinally adjusted to achieve the required tolerance in the second slot (in which the slide plate 20 is received).

In order to allow for adjustment of the upper part 76 toward and away from the slide plte 20, i.e. in a direction parallel with the first top surface 86, two bracket plates 108 are provided, one at either end of the guide member 22. Only one such plate is visible in FIG. 5, but both are seen in FIG. 1. More particularly, each bracket plate 108 is in the shape of a rectangular parallelopiped, having a height substantially equal to the height of the combined lower and upper parts 74 and 76 of the guide member, when the parts are nested together. Toward the bottom of the bracket plate 108 there is an unthreaded bore hole 110 adapted to receive the threaded shank 101 of a threaded fastener 113, whereas toward the top of the bracket plate 108 there is a threaded hole 115 adapted to receive a headless Allen screw 117. The threaded fastener 113 is adapted to pass through the hole 110 and then thread into a threaded borehole 118 with which it is aligned in FIG. 5. Tightening of the threaded fastener 113 will secure the bracket plate 108 tightly against the outside surface 84 of the lower part 74.

There is no hole in the upper part 76 corresponding to or aligned with the threaded hole 115 for the Allen screw 117. Instead, as the Allen screw 117 is threaded into and through the threaded hole 115, it will bear against the upper part 76 of the guide member 22, and will push the upper member 76 toward the slide plate 20, with respect to the lower part 74. Naturally this movement has a natural limit constituted by the abutment of the surfaces 90 and 97. However, it is contemplated that the dimensions and sizes of the various faces and surfaces of the lower and upper parts 74 and 76 will be selected such that some play remains between the surfaces 90 and 97 when the surface 95 is against the side wall 120 of the slide member 20. Thus, adjustment of the threaded members 118 can be used to adjust the tolerance of the slide plate 20 within the second slot.

Figure 2:
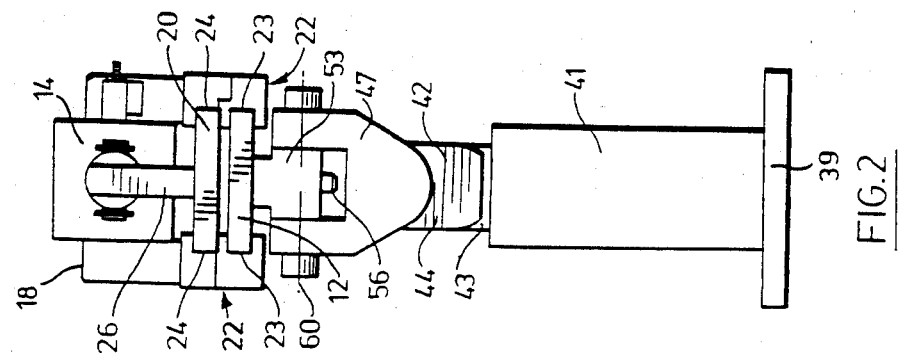
FIG. 2 is a front elevational view of the machine component of FIG. 1.

It will be readily understood from the drawing that the two guide members 22 located on either side of the plates 12 and 20 act in tandem. It will further be evident that the particular construction shown for the guide member 22 in FIG. 5 can be used on both sides of the plates 12 and 20, except that the upper and lower parts 74 on the opposite side of the plates will be rotated through 180° about a vertical axis. Thus, looking at the end elevation shown in FIG. 2, the guide member 22 at the left does not show the step between the surfaces 86 and 88, whereas the guide member 22 at the right does show the step in elevation.

The cylinder 14 does not need to be described in any detail, since it may be an off-the-shelf item of conventional construction. In FIG. 1, connectors 120 are provided for the air conduits necessary to operate the cylinder 14.

It is thus apparent that, by loosening and tightening three lock screws 122, 51 and 121, the angular orientation and disposition of the base plate 12 with respect to the flange 39 can be infinitely vared, and that, once the base plate 12 has been placed into its desired orientation, the slide plate 20 can be reciprocated back and forth in a direction parallel with the base plate 12, by the operation of the cylinder 14 in a reciprocating manner.

Attention is now directed to FIG. 4, which shows the second embodiment of the invention. In FIG. 4, the parts which are identical to those shown in FIGS. 1-3 retain the same numerals.

In the embodiment of FIG. 4, the base plate 12 has affixed thereto a toggle base plate 125, the connection being by way of threaded fasteners 126. The mounting means 18 at the rightward end of the toggle base plate 125 is the same as that already described with respect to FIGS. 1-3, and need not be described again. Furthermore, the pneumatic cylinder 14' is also substantially the same as the cylinder 14 in FIG. 1.

Two guide members 22 are provided at either side of the base plate 12, toward the leftward end thereof, and the various components of the guide members 22 are exactly the same as in the embodiment earlier described, particularly with respect to FIG. 5. This includes the lower part 74, the upper part 76, the bracket plates 108, and the other components which are not visible in FIG. 4 but which can be seen in FIGS. 5-7. Thus, there is defined, by the cooperation between the lower part 74 and the upper part 76 of the guide member 22, a second slot in which the slide plate 20 can move longitudinally with respect to the base plate 12. A bracket 26 is again affixed to the slide plate 20.

Secured laterally across the rightward ends of the two guide members 22 is a toggle bracket 128. The toggle bracket 128 has a base flange 130 which is elongated in the direction perpendicular to the plane of the drawing paper, and which bridges between the two guide members 22. Upstanding substantially centrally from the base flange 130 is a vertical portion 132 to which a toggle lever 134 is pivotally mounted about a first axis 136 defined by a cylindrical pin. A toggle link 138 is also provided, and is pivotally mounted at one end 140 to the bracket 26 about an axis 141 defined by a cylindrical pin, and is pivotally mounted at the other end 143 to the toggle lever at a second axis 145 spaced from the first axis 136. The piston 16 of the cylinder 14' is attached to a clevis 148 which in turn is pivotally mounted to the toggle lever 134 at a third axis 150 which is spaced from the first axis 136. As can be seen in FIG. 4, the second and third axes 145 and 150 have different spacings from the first axis 136. As a result, a given length of extension of the piston 16 will cause a movement of the slide plate 20 which is not the same as that given length of extension. More particularly, it can be seen that the toggle link 138 is connected at an axis 145 which is such that the distance between the axis 145 and the axis 136 is less than the distance between the axis 150 and the axis 136. This will mean that the distance through which the slide plate moves for a given extension of the piston 16 is less than that extension.

It can also be seen in FIG. 4 that there are provided three openings 152 (only two visible in FIG. 4) in the toggle lever 134, so that the toggle link 138 has a choice of connecting locations with the toggle lever 134. This allows the user to change the ratio of movement between the slide plate 20 and the piston 16.

It will be understood that further modifications and changes may be made from the specific embodiments illustrated in the drawings and described above, without departing from the essence and scope of the invention as set forth in the appended claims.

We claim:

1. A machine component comprising:
   an elongated base plate with side edges,
   a linear actuator assembly having two parts which can move away from and toward each other,
   first mounting means on said base plate, said mounting means supporting one part of said assembly,
   a slide plate rectangular in cross-section and having parallel straight side edges, two elongated guide members each having a rectangular slot adapted to slidingly receive the edge of the slide plate, each elongated guide member including a lower part and an upper part and means for securing them together, the lower part having means for attachment to the base plate, said rectangular slot having (1) a first side wall adjacent to and parallel with the base plate, said first side wall being defined by a surface of said lower part, (2) a second side wall defined by a surface of said upper part, and (3) a bottom wall defined by a surface of one of said upper and lower parts, the upper and lower parts having oblique mating surfaces such that longitudinal meovement of one part with respect to the other causes the parts to separate from or approach each other in a manner to change the width of said slot,
   and second mounting means establishing a connection between the slide plate and the other part of said assembly.

2. The machine component claimed in claim 1, in which said fastening means is capable of affixing each guide member separately to the base at any one of a plurality of longitudinal locations therealong.

3. The machine component claimed in claim 1, in which said first mounting means is adjacent one end of the base plate, and pivotally supports one part of said linear actuator assembly.

4. The machine component claimed in claim 1, in which the base plate is rectangular in cross-section, and in which said means for attachment to the base includes a further slot in the lower part for receiving a side edge of the base plate, the further slot being substantially rectangular.

5. The machine component claimed in claim 14, in which the upper part of each guide member is movable with respect to the lower part in the direction normal to said bottom wall of the second slot, and in which means are provided to restrain said upper part from moving away from said slide plate beyond a given position.

6. The machine component claimed in claim 5, in which said means for restraining the upper part comprises two bracket plates secured to each lower part at spaced-apart locations and extending adjacent the corresponding upper part remote from said slide plate, and two threaded members threaded through the respective bracket plates and bearing against said upper part, whereby rotation of said threaded members in one direction advances them toward the upper part and pushes the latter toward the slide plates.

7. The machine component claimed in claim 1, in which the second mounting means connects one part of said assembly to the slide plate through a bracket affixed to the slide plate, the said one part being in turn attached to said bracket.

8. The machine component claimed in claim 1, in which the second mounting means comprises a toggle bracket fixed with respect to the base plate, a toggle lever located above the slide plate and pivotally mounted to said toggle bracket about a first axis, a clevis bracket affixed to the slide plate, a toggle link pivotally mounted at one end to said clevis bracket and pivotally mounted at the other end to said toggle lever at a second axis spaced from said first axis, one part of said assembly being pivotally mounted to said toggle lever at a third axis spaced from said first axis, the second and third axes being spaced different distances from said first axis.

9. The machine component claimed in claim 1, in which the second mounting means comprises a toggle bracket fixed with respect to the base plate, a toggle lever located above the slide plate and pivotally mounted to said toggle bracket about a first axis, the toggle bracket having a plurality of attachment openings at different spacings from said first axis, a clevis bracket affixed to the slide plate, a toggle link pivotally mounted at one end to said clevis bracket and pivotally mounted at the other end to said toggle bracket at one of said plurality of openings, constituting a second axis spaced from said first axis, one part of said assembly being pivotally mounted to said toggle bracket at a third axis spaced from said first axis, whereby the spacing of the second axis from the first axis can be adjusted by selecting a different opening, and whereby the second and third axes are spaced at different distances from said first axis.

* * * * *